United States Patent [19]
Deckard et al.

[11] Patent Number: 6,012,289
[45] Date of Patent: Jan. 11, 2000

[54] APPARATUS AND METHOD FOR UTILIZING A LEARNED WASTEGATE CONTROL SIGNAL FOR CONTROLLING TURBOCHARGER OPERATION

[75] Inventors: Mitchel R. Deckard, Lafayette; David L. Frohberg, West Lafayette; Phillip J. Houtz, Lafayette, all of Ind.; Charles J. Kocian, Peoria, Ill.; Kevin A. Lantz, Metamora, Ill.; James B. Maddock, Washington, Ill.; Gregg W. Uhland, Lafayette, Ind.

[73] Assignee: Caterpillar Inc., Peoria, Ill.

[21] Appl. No.: 08/974,327

[22] Filed: Nov. 19, 1997

[51] Int. Cl.⁷ .................................................. F02B 37/12
[52] U.S. Cl. .............................................................. 60/602
[58] Field of Search ................................................ 60/602

[56] References Cited

U.S. PATENT DOCUMENTS

| | | | |
|---|---|---|---|
| 5,036,669 | 8/1991 | Earleson et al. | 60/602 |
| 5,447,031 | 9/1995 | Betts et al. | 60/603 |
| 5,586,744 | 12/1996 | Smith et al. | 251/61.5 |

Primary Examiner—Noah P. Kamen

[57] ABSTRACT

A method for controlling an engine turbocharger having a wastegate control valve is provided where the turbocharger is controlled by an electronic controller which is capable of delivering a wastegate control signal to the wastegate control valve. A determination is made as to whether an engine speed falls within a predetermined speed range defined by a first predetermined speed and a second predetermined speed, where the second predetermined speed is higher than the first predetermined speed. A predetermined initializing wastegate control signal may be delivered to the wastegate control valve in response to the engine speed falling within the predetermined speed range. A determination is made as to whether an engine speed exceeds the second predetermined speed, and a determination is made as to whether an engine load falls within a predetermined load range defined by a first predetermined load and a second predetermined load, where the second predetermined load is greater than the first predetermined load. A stored control signal value is retrieved from memory associated with the electronic controller and a wastegate control signal corresponding thereto is delivered to the wastegate control valve in response to the engine speed exceeding the second predetermined speed and the engine load falling within the predetermined load range. The stored control signal value may be updated with a learned control signal value determined during certain engine operating conditions.

15 Claims, 3 Drawing Sheets

APPARATUS AND METHOD FOR UTILIZING A LEARNED WASTEGATE CONTROL SIGNAL FOR CONTROLLING TURBOCHARGER OPERATION

TECHNICAL FIELD

This invention relates generally to the field of electronically controlled turbocharged engines, and more particularly to an electronic control for controlling operation of a wastegate control valve of an engine turbocharger based upon sensed engine operating conditions.

BACKGROUND ART

Turbocharged engines are well known in the art. A turbocharger may include a turbine wheel that is in the exhaust path of the engine. Mechanically connected to the turbine wheel is a compressor wheel that is located in the intake manifold of the engine. The engine exhaust causes the turbine wheel to rotate thereby causing the compressor wheel to compress the air entering the engine intake manifold. By compressing the air, a greater quantity of air can be introduced into the engine cylinders, thereby permitting a greater quantity of fuel to be injected, thus increasing the power output of the engine over a normally operated engine.

In some instances, compressing the air may cause too great a pressure in the intake manifold or too much pressure in the engine cylinder, which could potentially cause engine damage. Turbocharger overspeeds can also occur, possibly resulting in low cycle fatigue failures of the turbocharger after several overspeeds. A wastegate control valve may be included in order to prevent the pressure from exceeding a level at which damage might occur and to prevent overspeeds. The wastegate control valve is typically connected between the engine intake and exhaust manifolds and can be operated to allow exhaust gases to bypass the turbocharger turbine wheel so as to reduce the turbine wheel speed and thus reduce the pressure of the air which is provided to the engine cylinder via the intake manifold.

Both strictly mechanically operated wastegate control valves and electronically operable wastegate control valves are known. In the case of electronically operable wastegate control valves an electronic control module can be utilized to control the amount that the wastegate control valve is opened, and thus control the amount of exhaust gas which bypasses the turbocharger turbine wheel.

In such electronically operable wastegate control valves a problem can occur if the wastegate control valve is not operated fast enough to prevent potentially damaging conditions. For example, the electronic control module may sense the boost pressure provided by the turbocharger and deliver a wastegate control signal to the wastegate control valve in order to open the wastegate control valve if the sensed boost pressure exceeds a predetermined value. However, under some conditions the boost pressure may become high enough to cause the turbocharger to overspeed before the electronic control module responsively delivers a wastegate control signal to the wastegate control valve. A possible solution to the problem is to select a lower predetermined boost pressure at which the electronic control module acts to open the wastegate control valve. However, if such a lower boost pressure is selected engine performance may be adversely affected.

Another problem which can occur is that various component parts of the wastegate control valve can wear over time and thus the wastegate control signal required to move the wastegate control valve a given distance can also vary.

Accordingly, the present invention is directed to overcoming one or more of the problems as set forth above.

DISCLOSURE OF THE INVENTION

In one aspect of the present invention a method for controlling an engine turbocharger having a wastegate control valve is provided where the turbocharger is controlled by an electronic controller which is capable of delivering a wastegate control signal to the wastegate control valve. A determination is made as to whether an engine speed falls within a predetermined speed range defined by a first predetermined speed and a second predetermined speed, where the second predetermined speed is higher than the first predetermined speed. A predetermined initializing wastegate control signal is delivered to the wastegate control valve in response to the engine speed falling within the predetermined speed range. A determination is made as to whether an engine speed exceeds the second predetermined speed, and a determination is made as to whether an engine load falls within a predetermined load range defined by a first predetermined load and a second predetermined load, where the second predetermined load is greater than the first predetermined load. A stored control signal value is retrieved from memory associated with the electronic controller and a wastegate control signal corresponding thereto is delivered to the wastegate control valve in response to the engine speed exceeding the second predetermined speed and the engine load falling within the predetermined load range.

In another aspect of the present invention apparatus for controlling operation of an engine including a turbocharger having a wastegate control valve is provided. An electronic controller including memory associated therewith is connected to the wastegate control valve. An engine speed sensor is connected to the electronic controller and a fuel delivery mechanism is connected to the electronic controller. The electronic controller is operable to monitor engine speed based upon signals received from the engine speed sensor and is operable to determine engine load based at least in part upon fuel delivered by the fuel delivery mechanism. Based upon one or more monitored engine parameters the controller determines when the engine is in an acceleration mode. When the engine is determined to being an acceleration mode, the electronic controller is operable to retrieve a stored control signal value from memory and to deliver a wastegate control signal corresponding thereto to the wastegate control valve. The delivered wastegate control signal causes the wastegate control valve to move an amount which allows sufficient exhaust gas to bypass a turbine wheel of the turbocharger so that the turbocharger does not overspeed during acceleration.

In both the method and apparatus the stored control signal value can be updated with a learned control signal value determined by the electronic controller when the engine is operating in a wastegate governed mode in order to take into account variations and/or changes in the wastegate control valve

BEST MODE FOR CARRYING OUT THE INVENTION

Figure 1:
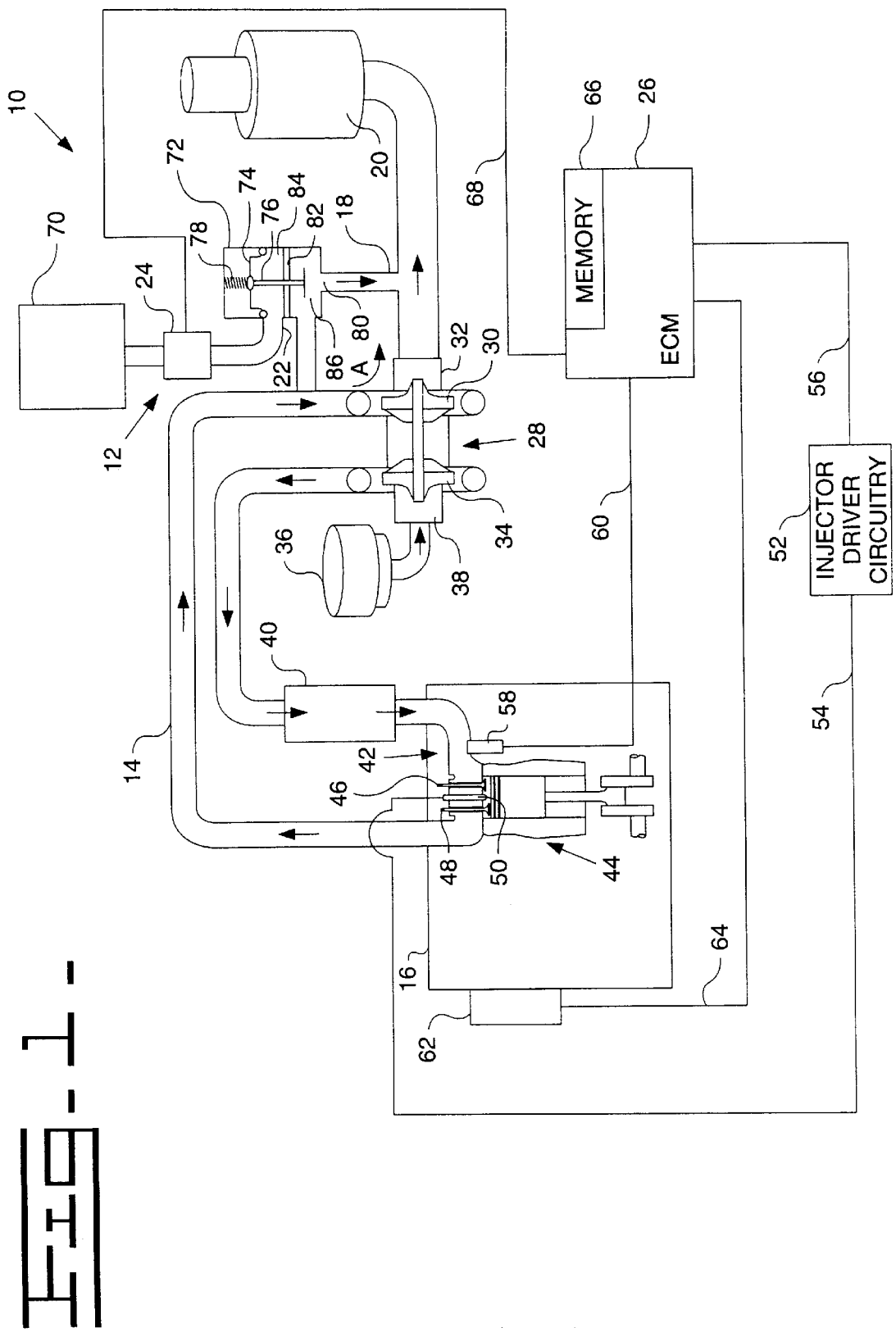
FIG. 1 is a block diagram representation of an embodiment of the present invention.

Referring to FIG. 1, a preferred embodiment of the wastegate control 10 of the present invention is shown. A wastegate control valve 12 is connected between an exhaust manifold 14 of an internal combustion engine 16 and the inlet 18 to an exhaust muffler 20. The wastegate control valve 12 includes an inlet 22 connected to a solenoid operated portion 24 of the valve 12. The solenoid operated valve portion 24 is connected to an electronic control module (ECM) 26 for control thereby. The wastegate control valve 12, when opened as shown, forms an exhaust path that is parallel to exhaust path (A) running through a turbocharger 28, and specifically through a turbine wheel 30 of the turbocharger to an exhaust outlet 32 and to the muffler 20.

The turbine wheel 30 is mechanically connected to a compressor wheel 34. Air flows through an air cleaner 36 into a compressor wheel inlet 38. The compressor wheel 34 causes the air to be compressed, the amount of such compression being a function of the rotational speed of the turbine wheel 30. It is recognized that turbochargers having both a high and low pressure turbine wheel and corresponding high and low pressure compressor wheels are known in the art. The present invention can be incorporated into engines having a single turbine wheel/compressor wheel combination such as shown, as well as those turbocharged engines having both high and low pressure turbine wheel/compressor wheel combinations.

An aftercooler 40 is connected to the output of the compressor wheel 34 and is connected to an intake manifold 42 of the engine 16. A single cylinder 44 of engine 16 is shown in FIG. 1. However, engine 16 may include any number of cylinders 44. Cylinder 44 includes at least one intake valve 46 and at least one exhaust valve 48. A fuel injector 50 injects fuel into cylinder 44 in response to receiving an injector driver command signal from the injector driver circuitry 52 over conductive path 54. The driver circuitry 52 produces the injector driver command as a function of a fuel command signal delivered by the ECM 26 over conductive path 56. After the air fuel mixture has been detonated, exhaust gas leaves the engine cylinder 44 through exhaust valve 48 and enters exhaust manifold 14.

ECM 26 is connected to a boost pressure sensor 58 via a conductive path 60. Boost pressure sensor 58 produces a boost pressure signal which is a function air pressure within intake manifold 42. ECM 26 senses the boost pressure of intake manifold 42 via monitoring of the boost pressure signals produced by boost pressure sensor 58.

An engine speed sensor 62 is connected to the camshaft of engine 16 and produces an engine speed signal on conductive path 64 which is connected to ECM 26. ECM 26 preferably includes memory 66, such as battery backed RAM.

The ECM 26 is connected to solenoid operated valve portion 24 via conductive path 68. Solenoid operated valve portion 24 is connected to a high pressure air source 70, such as a compressor or compressed air tanks. In a conventional manner, wastegate control valve 12 includes a housing 72 and a diaphragm 74 connected to the housing near the perimeter of the diaphragm 74. A valve 76 and a spring 78 are connected to the diaphragm 74. Spring 78 biases valve 76 into a closed position in which the valve closes an exhaust bypass opening 80 to prevent exhaust gas from bypassing turbine wheel 30. A divider 82 is attached within housing 72 to create separate cavities within housing 72. For example, housing 72 includes a control pressure cavity 84 and an exhaust cavity 86. The control pressure cavity 84 is connected through solenoid valve portion 24 to the source of high pressure air 70. ECM 26 controls the operation of wastegate control valve 12 via a signal delivered to solenoid valve portion 24 over conductive path 68. The pressure of air within control pressure cavity 84 can be varied by varying, for example, the duty cycle of a pulse width modulated signal delivered from ECM 26 to solenoid operated valve portion 24. In particular, as the duty cycle of such a signal is increased, the pressure within the control pressure cavity 84 increases. The pressure within control pressure cavity 84 enables movement of valve 76, and such pressure can be varied to cause the spring 78 to compress or decompress as desired. When valve 76 is opened as shown exhaust gas can bypass the turbine wheel 30 and flow through exhaust cavity 86 and opening 80 to muffler 20. By varying the signal delivered to valve portion 24 ECM 26 controls the not only whether valve 76 is opened or closed, but also controls how far the valve is opened so as to control the amount of exhaust gas which bypasses turbine wheel 30. The wastegate control valve 12 therefore enables excessive boost pressures to be prevented and also enables turbocharger overspeeds to be prevented.

Figure 2A:
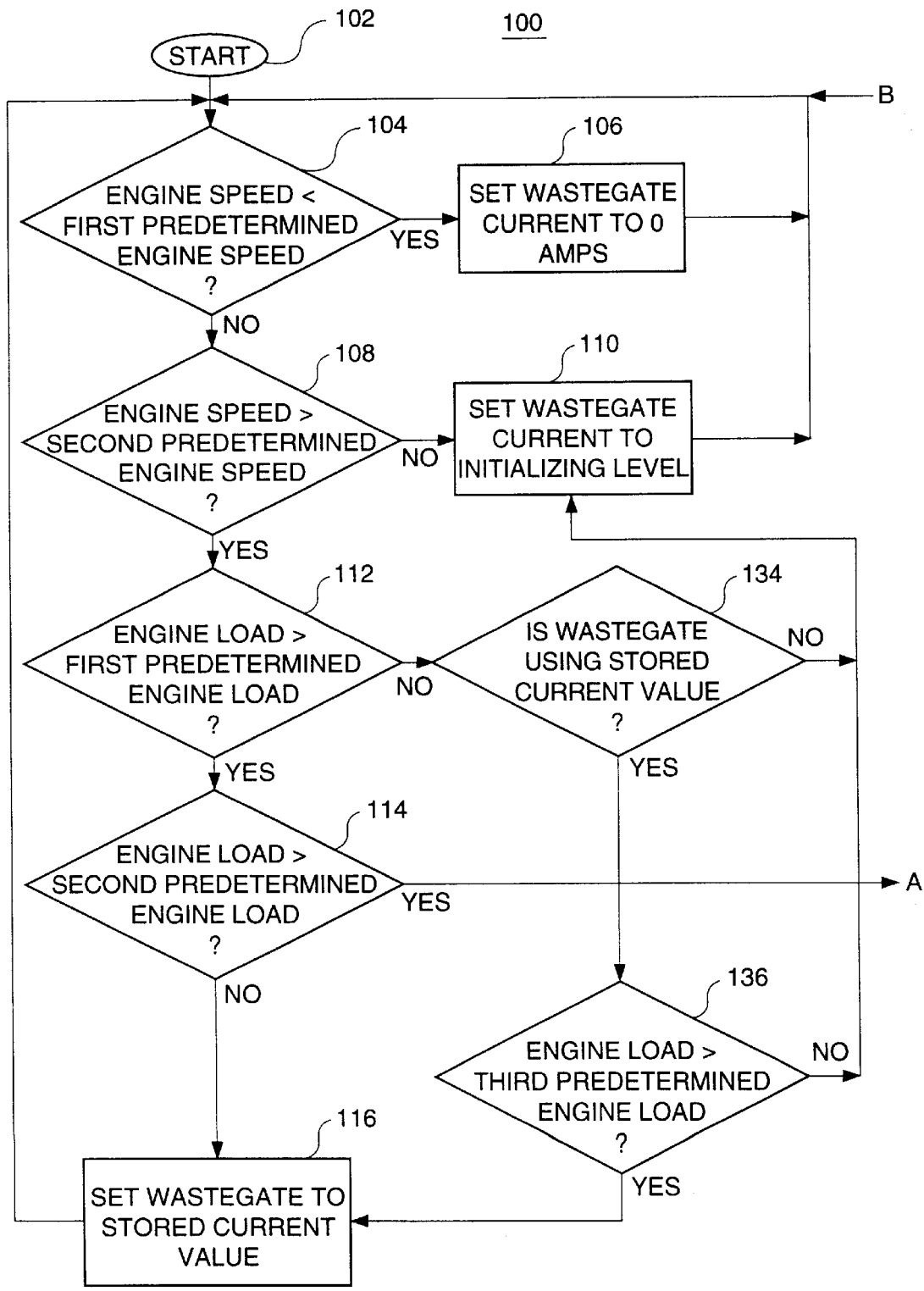
FIGS. 2A and 2B depict a flowchart of operation of the electronic control module utilized in the present invention.
Figure 2B:
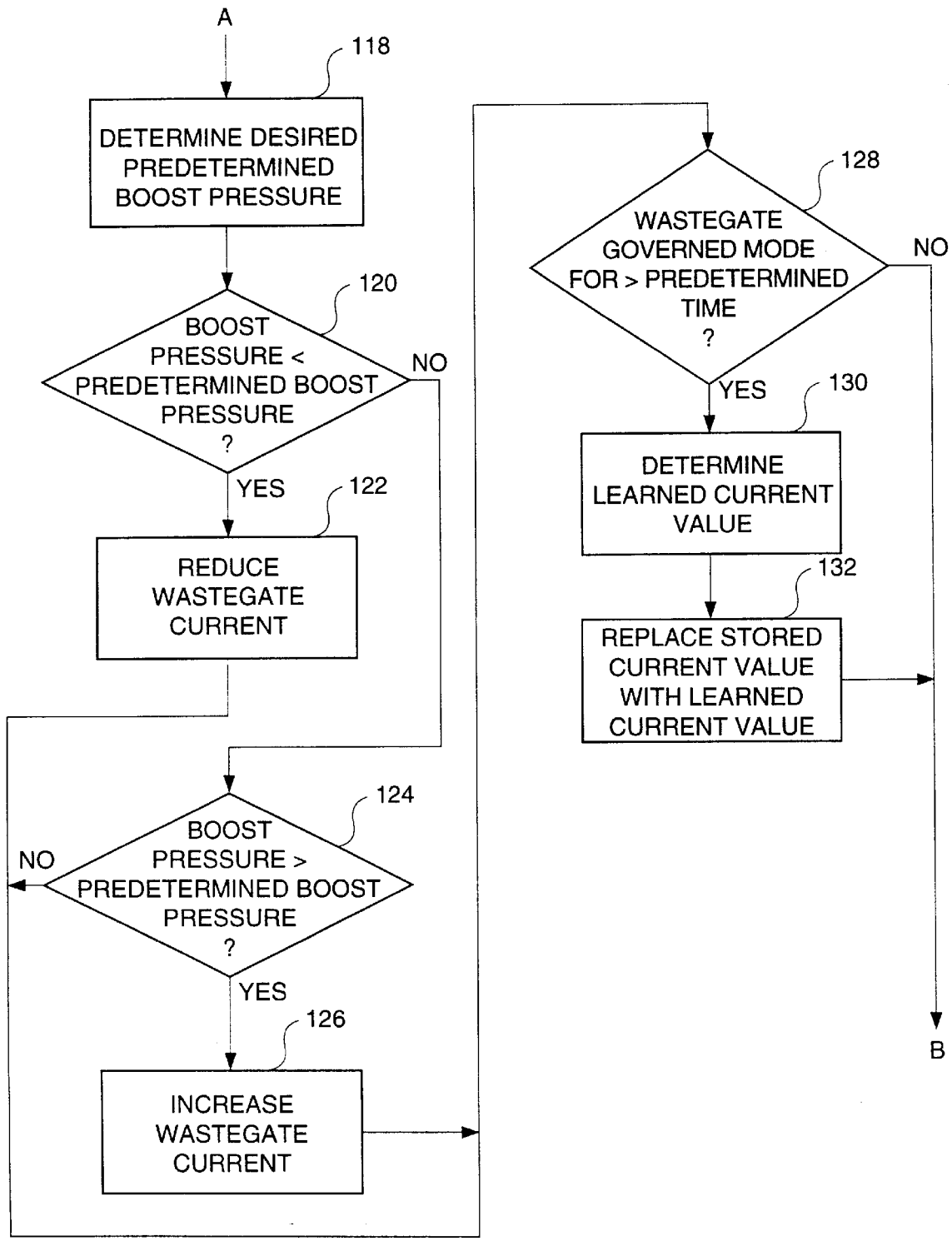

Referring now to FIGS. 2A and 2B, a flowchart 100 of a preferred embodiment of operation of the ECM 26 of the present invention is shown. Such operation can be incorporated within ECM 26 by any known means such as by coding of the operations of FIGS. 2A and 2B using any suitable microprocessor and assembly language associated with the microprocessor. Coding such software is a mechanical step for those skilled in the art.

It is recognized that the wastegate current levels specified herein refer to the average current provided to the solenoid valve portion 24. Such average current increases as a function of increase in duty cycle of the wastegate control signal delivered by ECM 26 and decreases as a function of decrease in duty cycle of the wastegate control signal delivered by ECM 26. Accordingly, setting the wastegate current to a specified value corresponds to setting the duty cycle of a wastegate control signal delivered by ECM 26 to a specified value.

Engine/turbocharger operation begins as indicated at start block 102. The ECM 26 senses engine speed based upon signals from engine sensor 62 and a determination is made as to whether the engine speed is below a first predetermined engine speed as indicated at block 104. If the engine speed is below the predetermined engine speed then ECM 26 sets the wastegate current to zero amperes as indicated in block 106 and operation returns to block 104. At zero amperes spring 78 of wastegate control valve biases valve 76 to close opening 86 and no exhaust gas is capable of bypassing turbine wheel 30. By way of example, the first predetermined engine speed may be about 800 RPM, although other values may be readily utilized as determined by engine testing. The wastegate current may be set to zero below such speed because it is anticipated that there is little possibility for turbocharger overspeed or excessive boost pressures when the engine 16 is operating below such speed, and there is also little possibility of an immediately impending need to open wastegate control valve 12.

If the engine speed is above the first predetermined speed in block 104, ECM 26 determines whether the engine speed is above a second predetermined engine speed as shown in block 108. If the engine speed is not above the second predetermined engine speed, ECM 26 sets the wastegate current to an initializing level as indicated by block 110 and operation returns to block 104. Such initializing current level is a level which is sufficient to eat up at least some of the hysteresis in solenoid operated valve portion 24, but which is not sufficient to cause valve 76 to move out of its closed position with respect to opening 80. The second predetermined engine speed could be about 1200 RPM, it being recognized that other values could be utilized. The initializing current is intended to prepare wastegate control valve 12 for more responsive opening and may be, for example 0.35 amperes, although other values could readily be utilized depending upon the nature of wastegate control valve 12.

If the engine speed exceeds the second predetermined engine speed in block 108, ECM 26 determines if the engine load exceeds a first predetermined engine load as indicated in block 112. ECM 26 may determine engine load based upon fuel delivered by a fuel delivery mechanism, such as fuel injector 50. For example, the "rack" of the engine can be determined based upon the length of time the fuel injector is opened. A stored map of fuel delivered as a function of rack and engine speed can then be used to determine the amount of fuel being delivered to the engine. The determined fuel amount can then be divided by a predetermined maximum fuel amount delivered at an engine full load, the ratio representing an engine load determination which is a percentage of the engine full load. If the engine load exceeds the first predetermined engine load, ECM 26 determines if the engine load is greater than a second predetermined engine load as indicated by block 114. If the engine load does not exceed the second predetermined engine load then ECM 26 sets the wastegate current to a stored current value as indicated at block 116 and operation returns to block 104. In this regard, the stored current value can be retrieved from storage in memory such as battery backed RAM of ECM 26 and may initially be a value which is stored during manufacture.

By way of example, the first predetermined engine load may be about fifty percent of an engine full load and the second predetermined engine load may be about ninety-five percent of an engine full load, although it is recognized that other engine loads could be utilized. The engine load is monitored by ECM 26 in order to determine when the engine is in an acceleration mode. In this example, the engine is assumed to be in an acceleration mode when the engine speed exceeds 1200 RPM and the engine load exceeds fifty percent of an engine full load. The possibility of a turbocharger overspeed exists when the engine is in such an acceleration mode and therefore the wastegate current is set to the stored value retrieved from memory, such value being sufficient to open wastegate control valve 12 enough to prevent such an overspeed. For example, the stored value could initially be 0.65 amperes, although it is recognized that other values could readily be utilized and an appropriate value is determinable by testing of the engine type in question.

If the engine load exceeds the second predetermined engine load then ECM 26 enters a wastegate governed mode during which the wastegate current is adjusted in attempt to achieve a predetermined boost pressure as indicated by blocks 118, 120, 122, 124, and 126 (FIG. 2B). In particular, in block 118 ECM 26 retrieves a predetermined boost pressure from memory 66, which boost pressure may be stored in a map which is a function of engine rack and engine speed. In block 120 ECM 26 senses the boost pressure based upon signals received from boost pressure sensor 58 in intake manifold 42. If the boost pressure is less than the predetermined boost pressure then the wastegate current is reduced as indicated in block 122 in order to reduce the amount the wastegate control valve 12 is open. Otherwise, in block 124 if the boost pressure is greater than the predetermined boost pressure then the wastegate current is increased as indicated in block 126 in order to increase the amount the wastegate control valve 12 is open.

After the wastegate current is adjusted in either block 120 or block 124, or if no further adjustment is necessary, a determination is made as to whether the system has been operating in the wastegate governed mode for a predetermined time period as indicated in block 128. If so, a learned current value is determined in block 130, which learned current value is based upon the wastegate current set in attempt to achieve the predetermined boost pressure. The stored current value is then replaced with the determined learned current value as indicated in block 132. The predetermined time period utilized may be about 20 seconds, although it is recognized that other time periods could likewise be utilized. It is desirable to wait the predetermined time period before determining a learned current value so as to give the system time to adjust the wastegate current in order to approach the predetermined boost pressure.

In a preferred embodiment of the invention the learned current value is set at about the same value as the wastegate current set in attempt to achieve the predetermined boost pressure. By determining a learned current value, the system is capable of making adjustments for variations and/or changes in wastegate control valve 12 which result in changes and/or variations in the current required to move the wastegate control valve a given distance. It is therefore recognized that the learned current value determined in block 130 could be a value which is different than the wastegate current set in attempt to achieve the predetermined boost pressure. For example, ECM 26 could include a stored map which indicates that a wastegate current of 0.7 amperes should be required to achieve the predetermined boost pressure. If adjustments are made in the wastegate governed mode setting the wastegate current to 0.77 amperes in attempt to achieve the predetermined boost pressure, it is seen that the current required is actually ten percent higher. In such case the learned current value determined by the ECM 26 in block 130 could be a ten percent upward adjustment of the originally stored current value.

Referring again to block 112, if a determination is made that the engine load is not greater than the first predetermined engine load, ECM 26 determines if the wastegate current then being utilized is the stored current value as indicated in block 134. If so, ECM 26 determines if the engine load is greater than a third predetermined engine load, which is less than the first predetermined engine load, as indicated in block 136. If so, the wastegate current is again set to, or remains at, the stored current value as indicated in block 116. If a determination is made that the engine load is not greater than the third predetermined engine load, then the wastegate current is set to the current initializing level as indicated in block 110. Steps 134 and 136 are utilized to determine when the system should stop using the stored current value. The third predetermined engine load could be about twenty-five percent of the engine full load, although other values could be utilized. It is recognized that setting the wastegate current to the initializing level as soon as the engine load falls below the first predetermined engine load could result in an unstable situation where wastegate current adjustments would cause the engine load to repetitively rise above and fall below the first predetermined engine load. Accordingly, the third predetermined engine load is utilized as a check as to when to change the wastegate current from the stored current value to the initializing level.

Industrial Applicability

The present invention provides an advantageous apparatus and method for controlling operation of a turbocharger of an engine. First, by setting the current to an initializing level as indicated in block 110, the wastegate control valve is placed in a ready mode such that it is capable of quickly responding, or opening, if necessary. Further, the wastegate current is set to the stored current value when the engine is in acceleration mode, in this case when then the engine speed is above the second predetermined engine speed and when the engine load falls within a range defined by the first and second predetermined engine loads. By setting the wastegate current to the stored current value when the engine is in an acceleration mode, the wastegate control valve is opened a sufficient amount to prevent the turbocharger from overspeeding. Still further, by monitoring the wastegate current during the wastegate governed mode, the ECM is able to determine a learned current value, and to replace the stored current value with the learned current value, in order to take into account variations and/or changes in the performance of the wastegate control valve, improving both short and long term turbocharger performance.

Other aspects, objects and advantages of the present invention can be obtained from a study of the drawings, the disclosure and the appended claims.

We claim:

1. A method for controlling an engine turbocharger having a wastegate control valve, the turbocharger being controllable by an electronic controller capable of delivering a wastegate control signal to the wastegate control valve, the method comprising the steps of:
    (a) determining if an engine speed falls within a predetermined speed range defined by a first predetermined speed and a second predetermined speed, the second predetermined speed being higher than the first predetermined speed;
    (b) delivering a predetermined initializing wastegate control signal to the wastegate control valve in response to the engine speed falling within the predetermined speed range in step (a);
    (c) determining if an engine speed exceeds the second predetermined speed;
    (d) determining if an engine load falls within a predetermined load range defined by a first predetermined load and a second predetermined load, the second predetermined load being greater than the first predetermined load; and
    (e) retrieving a stored control signal value from memory associated with the electronic controller and delivering a wastegate control signal corresponding thereto to the wastegate control valve in response to the engine speed exceeding the second predetermined speed in step (c) and the engine load falling within the predetermined load range in step (d).

2. The method, as set forth in claim 1, further comprising the steps of:
    (f) determining if an engine load exceeds the second predetermined load;
    (g) sensing a boost pressure in an intake manifold of the engine and adjusting the wastegate control signal delivered to the wastegate control valve in attempt to achieve a predetermined boost pressure in response to the engine load exceeding the second predetermined load in step (f);
    (h) determining a learned control signal value based upon the wastegate control signal delivered to the wastegate control valve in step (g); and
    (i) replacing the stored control signal value of step (e) with the learned control signal value determined in step (h).

3. The method, as set forth in claim 2, wherein steps (h) and (i) are performed after step (g) has been performed for at least a predetermined time period.

4. The method, as set forth in claim 2, wherein the learned control signal value determined in step (h) is a value which, if retrieved in step (e), would result in delivery of a wastegate control signal which is about the same as the wastegate control signal set in attempt to achieve the predetermined boost pressure in step (g).

5. The method, as set forth in claim 2, wherein the predetermined boost pressure of step (g) is stored in a three dimensional map based upon fuel delivered and engine speed, step (g) including retrieving the predetermined boost pressure from memory associated with the electronic controller.

6. The method, as set forth in claim 1, wherein the first predetermined speed is about 800 RPM and the second predetermined speed is about 1200 RPM.

7. The method, as set forth in claim 1, wherein the first predetermined load is about fifty percent of an engine full load and the second predetermined load is about ninety-five percent of an engine full load.

8. A method for controlling an engine including a turbocharger having a wastegate control valve, the engine being controlled by an electronic controller which is capable of delivering a wastegate control signal to the wastegate control valve, the method comprising the steps of:
    (a) monitoring at least one engine parameter;
    (b) determining when the engine is in an acceleration mode based at least in part on the engine parameter monitored in step (a);
    (c) retrieving a stored control signal value from memory associated with the electronic controller and delivering a wastegate control signal corresponding thereto to the wastegate control valve in response to the engine being in an acceleration mode as determined in step (b);
    (d) determining if an engine load exceeds a predetermined load;
    (e) sensing a boost pressure in an intake manifold of the engine and adjusting the wastegate control signal delivered to the wastegate control valve in attempt to achieve a predetermined boost pressure in response to the engine load exceeding the predetermined load as determined in step (d);
    (f) determining a learned control signal value based upon the wastegate control signal set in attempt to achieve the predetermined boost pressure in step (d); and
    (g) replacing the stored control signal value of step (c) with the learned control signal value determined in step (f).

9. The method, as set forth in claim 8, wherein step (a) includes monitoring an engine load and step (b) includes determining if the engine load exceeds a predetermined load which is less than the predetermined load of step (d).

10. The method, as set forth in claim 8, wherein step (a) includes monitoring an engine speed and step (b) includes determining if the engine speed exceeds a predetermined engine speed.

11. The method, as set forth in claim 8, wherein step (f) is performed after step (e) has been performed for a predetermined time period.

12. An apparatus for controlling operation of an engine including a turbocharger having a wastegate control valve, comprising:

an electronic controller including memory associated therewith, the electronic controller connected to the wastegate control valve;

an engine speed sensor connected to the electronic controller;

a fuel delivery mechanism connected to the electronic controller;

wherein the electronic controller is operable to monitor engine speed based upon signals received from the engine speed sensor and is operable to determine engine load based at least in part upon fuel delivered by the fuel delivery mechanism; and wherein, if the monitored engine speed exceeds a predetermined engine speed and the determined engine load falls within a predetermined load range, the electronic controller is operable to retrieve a stored control signal value from memory and to deliver a wastegate control signal corresponding thereto to the wastegate control valve.

13. The apparatus, as set forth in claim 12, further comprising:

a boost pressure sensor connected to the electronic controller;

wherein the electronic controller is operable to determine whether the engine load exceeds the predetermined load range; and wherein, if the engine load is determined to exceed the predetermined load range, the electronic controller is operable to monitor a boost pressure of the engine and to adjust the wastegate control signal delivered to the wastegate control valve in attempt to achieve a predetermined boost pressure.

14. The apparatus, as set forth in claim 13, wherein the electronic controller is operable to determine a learned control signal value as the wastegate control signal delivered to the wastegate control valve is adjusted in attempt to achieve the predetermined boost pressure, and wherein the electronic controller is operable to replace the stored control signal value with the learned control signal value.

15. The apparatus, as set forth in claim 12, wherein the memory includes battery backed RAM and the stored control signal value is stored in the battery backed RAM.

* * * * *